No. 705,786. Patented July 29, 1902.
H. A. POPPENHUSEN.
AUTOMATIC SWITCH.
(Application filed Oct. 31, 1901.)
(No Model.)
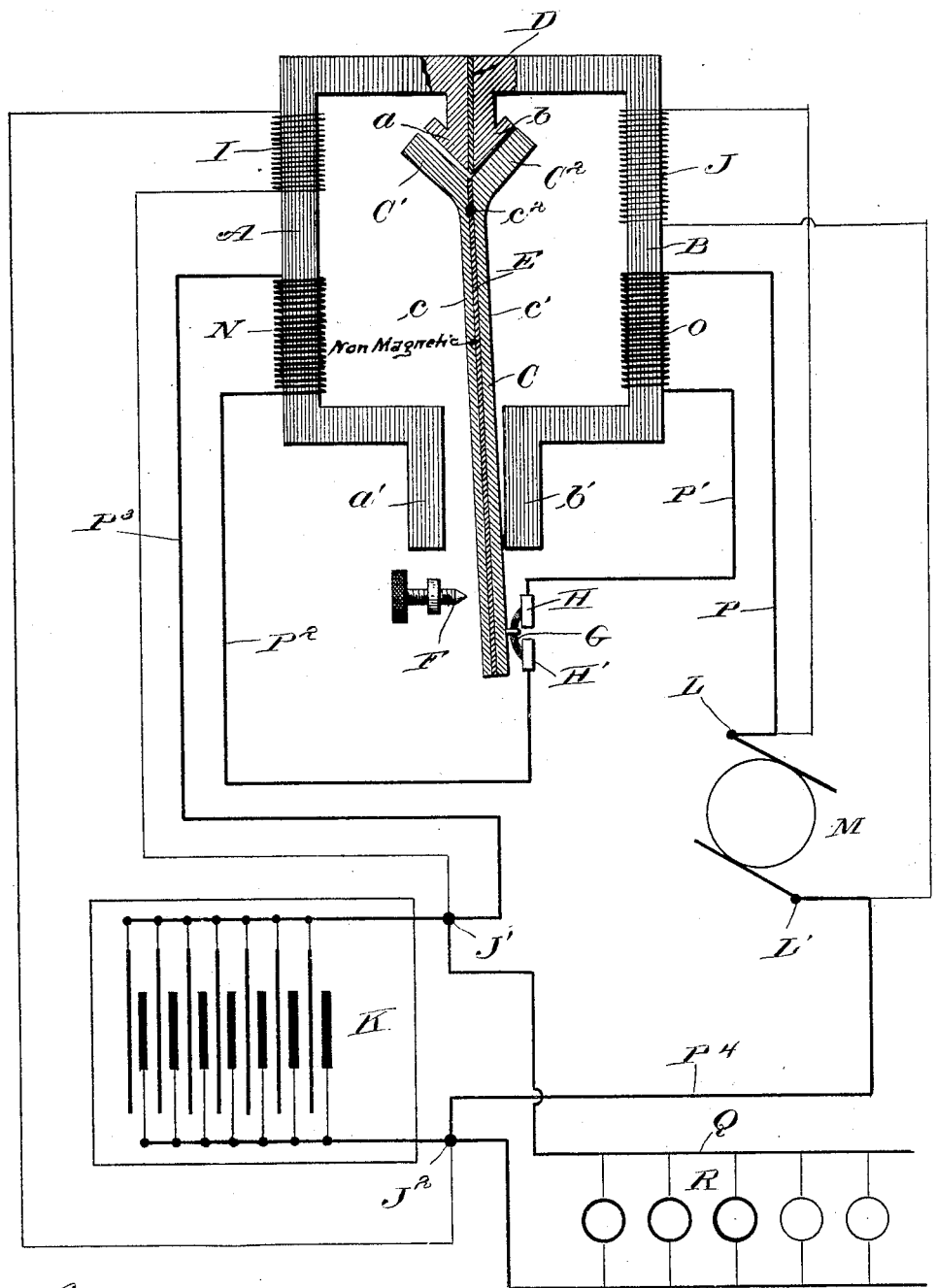
Witnesses:
H. S. Gaither
Carl M. Crawford
Inventor:
Herman A. Poppenhusen
by Poole & Brown
his Attorneys

UNITED STATES PATENT OFFICE.

HERMAN A. POPPENHUSEN, OF EVANSTON, ILLINOIS.

AUTOMATIC SWITCH.

SPECIFICATION forming part of Letters Patent No. 705,786, dated July 29, 1902.

Application filed October 31, 1901. Serial No. 80,594. (No model.)

*To all whom it may concern:*

Be it known that I, HERMAN A. POPPENHUSEN, of Evanston, in the county of Cook and State of Illinois, have invented certain new and useful Improvements in Automatic Switches; and I do hereby declare that the following is a full, clear, and exact description thereof, reference being had to the accompanying drawings, and to the letters of reference marked thereon, which form a part of this specification.

This invention relates to an improved automatic switch for use in connection with current-generating apparatus embracing a dynamo and a secondary or storage battery which is charged by the dynamo, said switch operating to control the working circuit in such manner that the same shall be broken or opened whenever through a decrease in the voltage of the dynamo the storage-battery voltage exceeds the dynamo voltage, thereby preventing the reversal of current in the working circuit and tendency of the battery-current to operate the dynamo as a motor, and thus avoiding liability of the burning out of the dynamo by such reverse current.

The accompanying drawing represents diagrammatically one practical form of my improved switch and its connections with a dynamo and storage battery.

As indicated in said drawing, A and B indicate two magnet-cores which are attached together, although magnetically separated, and are disposed symmetrically with respect to each other, and C is a double or duplex armature consisting of magnetically-separated parts or halves $c\ c'$. The cores A and B are shaped to form poles $a\ a'\ b\ b'$, of which the poles $a\ b$ are formed on the ends of the cores, which are attached to each other, but are separated by a strip D of brass or non-magnetic material which is inserted between the connected parts of the cores and poles $a'\ b'$, which are separated from each other by an air-space. The armature C is vibratory and is pivoted to swing on a pivot $c^2$, located at a point adjacent to the poles $a\ b$ of the cores A and B, with its free end extending between the separated poles $a'\ b'$. At its end adjacent to the pivot $c^2$ the armature C is provided with two arms $C'\ C^2$, which are severally made integral with the two parts or halves $c\ c'$ of the armature and are magnetically separated by means of a non-magnetic strip E, which extends between and separates the parts $c\ c'$ of the armature. The several parts above mentioned are so disposed that when the armature C is swung or oscillated on its pivot the part $c'$ will be brought against the pole $b'$ of the core B, while at the same time the arm $C^2$ will be brought against the opposite pole $b$ of said core. When swung in the opposite direction, the part $c$ of the armature approaches the pole $a'$ of the core A, while the arm $C'$ approaches the pole $a$ of said core. Movement of the armature C toward the pole $a'$ of the core A is limited by means of an adjustable stop F, the same as herein shown having the form of a set-screw. Said armature, moreover, carries at its side opposite said stop F a U-shaped contact-piece G, the ends of which are adapted for contact with two contact-plates H H'.

On the cores A and B are wound coils I and J, respectively, the coil I being a portion of a permanently-closed shunt-circuit from the terminals $J'\ J^2$ of a storage or secondary battery K, while the coil J is a portion of a permanently-closed shunt-circuit from terminals L L' of a dynamo, (indicated by M.) On the cores A and B are also wound coils N and O, which form parts of the main or working circuit of the system. Said working circuit consists of a conductor P, leading from the terminal L of the dynamo to the coil O, a conductor P', leading from the coil O to one of the contact-plates H, a conductor $P^2$, leading from the contact-plate H' to the coil N, a conductor $P^3$, leading from said coil N to the battery-terminal J', and a conductor $P^4$, leading from the dynamo-terminal L' to the battery-terminal $J^2$.

Q Q' are conductors leading from the storage-battery terminals J' and $J^2$ to electric lamps or other translating devices, (indicated by R.) The said electric lamps or translating devices are operated from the dynamo M and also from the storage battery K when the dynamo fails to supply the required current, as will be well understood by those acquainted with the art.

The coils I and J are of fine wire, the coil J, as shown in the drawings, being provided with a greater number of windings than the coil I. The coils N and O are of large or coarse wire, corresponding in capacity to the main or working line conductors. The coils J and O are wound in the same direction, so that the action of one augments the action of the other. The coils I and N are oppositely wound, so that the magnetic fields generated thereby are of opposite polarity, and the action of the coil N decreases the effect of the coil I. When the coil J, which is connected with the shunt-circuit from the dynamo M, is provided with a greater number of windings than the coil I, which is connected with the shunt-circuit from the storage battery, the magnetic flux through the core B will be greater than that through the core A, and the armature C will be held normally in contact with the poles $b\ b'$ of said core B, thereby maintaining the contact-piece G in contact with the plates H H'. By reason of the manner in which the main circuit-coils are wound when dynamo voltage exceeds the storage-battery voltage, as when the dynamo is charging the storage battery, the coil O increases the effect of the coil J, while the coil N decreases the effect of the coil I. It follows from under normal conditions the magnetic energy developed by the coils J and O will produce a strong positive pull on the armature, tending to keep the switch closed, and this pull being in proportion to the load in the working circuit makes the pressure on the contact-point in proportion to the load carried. If the dynamo voltage should decrease, the current in the working circuit, the voltage producing same being always equal to the difference between the dynamo and battery voltages, will also decrease, and when the difference between the dynamo and battery voltages reaches zero the current flowing through the working circuit will also be zero, and if no provision were made for preventing it as soon as the dynamo voltage should fall below the battery voltage the current in the working circuit would immediately become reversed, thereby giving rise to undesirable conditions—as, for instance, the storage battery would tend to run the dynamo as a motor, with liability of the burning out of the dynamo or other disastrous effects. In the apparatus described, however, when the dynamo voltage falls below the battery voltage the magnetic flux in the core A will become greater than that in the core B, the result being that the magnetic flux on the battery side or core A of the switch device will be greater than that on the opposite side or core B, with the result that the armature C will be swung toward the stop F and the switch will be opened, thereby interrupting the current in the main-line circuit and preventing the reverse current flowing through the dynamo. Moreover, the reversal of the current in the main-line circuit reverses the effect of the coils O and N, and the coil O will oppose the action of the coil J, while the coil N will assist the action of the coil I, so that the said coils I and N will exert a strong pull on the armature, tending to open the switch.

While I have shown the shunt-circuit coil J as having more windings than the shunt-circuit coil I, yet this is not essential to the operation of the switch, for the reason that if the said coils I and J be made with the same number of windings and the adjustable stop F set so that the armature is normally nearer the poles $b'$ and $b$ than it is to the poles $a$ and $a'$ then when the same magnetic energy is developed by the action of the coils I and J the magnetic flux will be greatest through the dynamo side of the switch or the core B, on which the coils J and O are located, by reason of the narrower air-space between the armature and the poles $b$ and $b'$, and the same effect will be produced as though the coils I and J were differently wound, the armature in such case being held in position to keep the working circuit closed so long as the dynamo is working normally, or, in other words, acting to charge the secondary battery.

In the operation of the apparatus described manifestly the conditions giving rise to the closing of the switch will depend on the battery voltage, and as this is designed to be somewhat less than the dynamo voltage and the switch is so constructed or arranged as to give normally a somewhat greater flux on the dynamo side of the switch-magnet cores the switch-armature will be positively held under normal conditions in position to maintain the main circuit closed, and while it is so closed the main-circuit coils in the dynamo side of the switch will aid the shunt-circuit coil to hold the switch in its closed position. Moreover, the magnetic flux tending to open the switch will be in proportion to the reverse or destructive current, so that if the dynamo voltage falls below the battery voltage the greater the excess of the battery voltage the more strongly will the power exerted by the switch-magnet act to draw the movable contact-piece G away from the contact-plates H H', and thereby break the main circuit. Similarly while working under normal conditions the greater the current in the working circuit the more strongly will the said contact-piece be held against the contact-plates, and if, as is preferred, the said contact-piece G be made elastic and of laminated structure the greater will be the area of contact between the ends of the flexible plates or strips constituting the said contact-piece and the contact-plates, this effect being due to the spreading of the layers constituting the elastic U-shaped contact-piece under increased pressure, tending to move the armature toward the plates H H'.

An important advantage of the switch described is that it is without springs or like mechanical means for controlling the action of the movable armature, it being obvious that the position of said armature and the action of the said contact devices through which the main-line circuit is opened and closed depends entirely upon the action of the electromagnets and is positive and certain in its character by reason of the fact that the action of the shunt-circuit magnets I and J is reinforced both in the open and closed position of the switch by the main-circuit magnets N and O.

I claim as my invention—

1. The combination of a dynamo, a storage battery, a circuit connecting the dynamo with the storage battery which includes a switch, and means for actuating the switch comprising two magnetic circuits, a movable armature which is included in said magnetic circuits and is connected with and operates the switch, and coils located severally on the two magnetic circuits; one of said coils forming part of a shunt-circuit from the dynamo and the other of said coils forming part of a shunt-circuit from the storage battery.

2. The combination of a dynamo, a storage battery, a circuit connecting the dynamo with the storage battery which includes a switch, and means for actuating the switch comprising two magnetic circuits, a movable armature which is connected with and operates the switch, said armature embracing two magnetically-separated parts which severally form parts of the two magnetic circuits and coils on the two magnet-cores which form parts of shunt-circuits from the dynamo and storage battery.

3. The combination of a dynamo, a storage battery, a circuit connecting the dynamo with the storage battery, which includes a switch, and means for actuating the switch comprising two magnetic circuits, a movable armature which is included in said magnetic circuits, and is connected with and operates the switch, coils on the two magnetic circuits which form parts of shunt-circuits from the dynamo and storage battery, and another coil on one of said magnetic circuits which forms part of the circuit connecting the dynamo with the storage battery and which is so wound that it augments or decreases the effect of one or the other of the said shunt-circuit coils.

4. The combination of a dynamo, a storage battery, a circuit connecting the dynamo with the storage battery, which includes a switch, and means for actuating the switch comprising two magnetic circuits, a movable armature which is connected with and operates the switch and which is included in said magnetic circuits, coils on the two magnetic circuits which form parts of shunt-circuits from the dynamo and storage battery, and two other coils on said magnetic circuits which form parts of the circuit connecting the dynamo with the storage battery and which are so wound that one of them augments the effect of one of the shunt-circuit coils and the other decreases the effect of the other of the said shunt-circuit coils.

5. A switch-actuating device comprising two magnetic circuits, a vibratory armature which is included in said magnetic circuits, and two coils located severally on the said magnetic circuits one of which forms part of one electric circuit and the other part of another electric circuit; said coils being adapted to give a greater magnetic flux in one of said cores than in the other.

6. A switch-actuating device comprising two magnet-cores which are mechanically connected but magnetically separated, a vibratory armature consisting of two magnetically-separated parts which operate severally in connection with the two magnet-cores, and coils on the said magnet-cores adapted to give a greater magnetic flux in one of said cores than in the other.

7. A switch-actuating device comprising two magnetic circuits, a vibratory armature which is included in said magnetic circuits, two coils located severally on said magnetic circuits one of which forms part of one electric circuit and the other part of another electric circuit; said coils being adapted to give a greater magnetic flux in one of said circuits than in the other, and another coil on one of said magnetic circuits which is so wound as to augment or decrease the action of the one or the other of said first-named coils.

8. A switch-actuating device comprising two magnetic circuits, a vibratory armature which is included in said magnetic circuits, two coils located severally on said magnetic circuits one of said coils forming part of one electric circuit and the other of said coils forming part of another electric circuit and said coils being adapted to give a greater magnetic flux in one of said magnetic circuits than in the other, and two other coils on said circuits which form parts of a single electric circuit and are so wound that one of them augments the action of one of the first-named coils and the other decreases the action of the other of said first-named coils.

9. A switch-actuating device embracing two magnet-cores, the poles of which are adjacent to each other, a pivotally-supported, vibratory armature adapted to approach and recede from the poles of said magnet-cores, and two coils located severally on said cores, one of said coils forming part of one electric circuit and the other part of another electric circuit and the said coils being adapted to give a greater magnetic flux in one of said magnet-cores than the other.

10. A switch-actuating device embracing two magnet-cores, which are mechanically connected but magnetically separated, and the poles of which are adjacent to each other, a pivotally-supported, vibratory armature embracing two magnetically-separated parts adapted, in the vibratory movement of the armature, to approach and recede from the poles of said magnet-cores, and coils on said cores adapted to give a greater magnetic flux in one of said cores than in the other.

11. A switch-actuating device embracing two magnetic circuits, a pivotally-supported, vibratory armature which is included in said magnetic circuits, an adjustable stop controlling the movement of the armature in one direction, and two coils located severally on said circuits, one of said coils forming part of one electric circuit and the other coil forming part of another electric circuit and said coils being adapted to give a greater magnetic flux in one of said circuits than in the other.

12. A switch-actuating device embracing two magnet-cores which are mechanically connected but magnetically separated, and the poles of which are adjacent to each other, a pivotally-supported, vibratory armature embracing two magnetically-separated parts adapted, in the vibratory movement of the armature, to approach and recede from the poles of said magnet-cores, an adjustable stop controlling the movement of the armature in one direction, and coils on said cores adapted to give a greater magnetic flux in one of said cores than in the other.

13. The combination of a dynamo, a storage battery, a working circuit connecting the dynamo with the storage battery, which includes a switch, a pivotally-supported, vibratory armature which is included in said magnetic circuits and is connected with and gives movement to the movable part of said switch, an adjustable stop controlling the movement of the armature, coils on the two magnetic circuits which form parts of shunt-circuits from the dynamo and storage battery, the coil in the dynamo shunt-circuit being adapted to give a greater magnetic flux than the coil in the storage-battery shunt-circuit, and other coils on said magnetic circuits forming parts of the said working circuit, one of said working-circuit coils being so arranged as to augment the action of one of the shunt-circuit coils, and the other of said working-circuit coils being arranged to decrease the action of the other of said shunt-circuit coils.

14. The combination of a dynamo, a storage battery, a working circuit connecting the dynamo with the storage battery which includes a switch, two mechanically-connected but magnetically-separated magnet-cores, the poles of which are adjacent to each other, a pivotally-supported, vibratory armature which is connected with and gives movement to the movable part of said switch, said armature embracing two magnetically-separated parts adapted, in the vibratory movement of the armature, to approach and recede from the poles of said magnet-cores, an adjustable stop controlling the movement of the armature in a direction to open the switch, coils on the two magnet-cores which form parts of shunt-circuits from the dynamo and storage battery, the coil in the dynamo shunt-circuit being adapted to give a greater magnetic flux in its magnet-core than the coil in the storage-battery shunt-circuit, and other coils on said magnet-cores, forming parts of the said working circuit, one of said working-circuit coils being so arranged as to augment the action of one of the shunt-circuit coils, and the other of said working-circuit coils being arranged to decrease the action of the other of said shunt-circuit coils.

In testimony that I claim the foregoing as my invention I affix my signature, in presence of two witnesses, this 28th day of October, A. D. 1901.

HERMAN A. POPPENHUSEN.

Witnesses:
C. CLARENCE POOLE,
WILLIAM L. HALL.